(12) United States Patent
Na et al.

(10) Patent No.: US 8,312,787 B2
(45) Date of Patent: Nov. 20, 2012

(54) SHIFT LEVER WITH BUTTON TYPE SHIFT KNOB

(75) Inventors: Myunglyul Na, Suwon-si (KR); Yunje Hwang, Ulsan (KR); Jeonhwan Kang, Daegu (KR)

(73) Assignee: Hyundai Motor Company, Seoul (KR)

( * ) Notice: Subject to any disclaimer, the term of this patent is extended or adjusted under 35 U.S.C. 154(b) by 108 days.

(21) Appl. No.: 12/826,028

(22) Filed: Jun. 29, 2010

(65) Prior Publication Data
US 2011/0126656 A1 Jun. 2, 2011

(30) Foreign Application Priority Data
Dec. 1, 2009 (KR) .................. 10-2009-0117650

(51) Int. Cl.
F59H 59/02 (2006.01)
(52) U.S. Cl. ...................................... 74/473.3
(58) Field of Classification Search ............. 74/473.1, 74/473.22, 473.23, 473.24, 427.26, 473.3
See application file for complete search history.

(56) References Cited

U.S. PATENT DOCUMENTS

| 3,648,536 | A | * | 3/1972 | Maina | 74/473.22 |
| 4,191,064 | A | * | 3/1980 | Houk et al. | 74/473.23 |
| 5,345,836 | A | * | 9/1994 | Yokoyama et al. | 74/473.23 |
| 5,458,017 | A | * | 10/1995 | Kanematsu et al. | 74/473.23 |
| 5,566,581 | A | * | 10/1996 | Smale et al. | 74/473.22 |
| 5,575,174 | A | * | 11/1996 | Kanematsu et al. | 74/473.23 |
| 5,617,760 | A | * | 4/1997 | Woeste et al. | 74/473.23 |
| 5,845,534 | A | * | 12/1998 | Kim | 74/473.12 |
| 5,848,855 | A | * | 12/1998 | Roossien | 403/329 |
| 6,082,214 | A | * | 7/2000 | Paparoni | 74/473.22 |
| 6,142,034 | A | * | 11/2000 | Rempinski | 74/473.22 |
| 6,298,743 | B1 | * | 10/2001 | Horn et al. | 74/473.3 |
| 6,318,209 | B1 | * | 11/2001 | Park | 74/525 |
| 6,789,444 | B2 | * | 9/2004 | Fujiwara et al. | 74/473.23 |
| 6,865,967 | B2 | * | 3/2005 | Shioji et al. | 74/473.23 |
| 7,272,988 | B2 | * | 9/2007 | Meyer et al. | 74/473.3 |
| 7,275,457 | B2 | * | 10/2007 | Easton | 74/473.12 |
| 7,360,469 | B2 | * | 4/2008 | Tomida | 74/537 |
| 7,430,940 | B2 | * | 10/2008 | Kondou et al. | 74/537 |
| 7,562,602 | B2 | * | 7/2009 | Blascok et al. | 74/473.22 |
| 7,650,812 | B2 | * | 1/2010 | Tomida | 74/473.13 |
| 2003/0192389 | A1 | * | 10/2003 | Van Camp et al. | 74/473.1 |
| 2005/0011293 | A1 | * | 1/2005 | Kondou et al. | 74/473.1 |
| 2007/0137359 | A1 |   | 6/2007 | Ohno et al. | |
| 2009/0193921 | A1 | * | 8/2009 | Ishizu et al. | 74/473.3 |
| 2010/0000359 | A1 | * | 1/2010 | Kops et al. | 74/473.3 |
| 2011/0197697 | A1 | * | 8/2011 | Morrissett et al. | 74/473.24 |

(Continued)

FOREIGN PATENT DOCUMENTS

JP 6-179331 A 6/1994

(Continued)

*Primary Examiner* — Justin Krause
*Assistant Examiner* — Valentin Craciun
(74) *Attorney, Agent, or Firm* — Morgan, Lewis & Bockius LLP

(57) ABSTRACT

A shift lever assembly with a button type shift knob may include a lower skirt slidably and rotatably coupled around a shift rod, an upper skirt disposed on the lower skirt and rotatably coupled to the lower skirt to allow relative rotation therebetween and to prevent relative straight motion therebetween, and a shift knob detachably attached to an upper portion of the shift rod, wherein the shift knob is slidably coupled to the upper skirt to permit an upper motion of the upper and lower skirts along a center axis of the shift rod and is eccentrically coupled to the upper skirt to prevent a relative rotation therebetween.

4 Claims, 4 Drawing Sheets

U.S. PATENT DOCUMENTS

2011/0290058 A1* 12/2011 Hahn et al. .................. 74/473.22
2012/0000311 A1* 1/2012 Shioji et al. .................. 74/473.3

FOREIGN PATENT DOCUMENTS

| | | |
|---|---|---|
| JP | 2000-43598 A | 2/2000 |
| JP | 2007-30854 A | 2/2007 |
| JP | 2007-90979 A | 4/2007 |
| KR | 10-0435285 B1 | 6/2004 |
| KR | 10-0521532 B1 | 10/2005 |
| KR | 10-2008-0013623 A | 2/2008 |
| KR | 10-2009-0030747 A | 3/2009 |
| KR | 10-2009-0102475 A | 9/2009 |

* cited by examiner

SHIFT LEVER WITH BUTTON TYPE SHIFT KNOB

CROSS-REFERENCE TO RELATED APPLICATIONS

The present application claims priority to Korean Patent Application Number 10-2009-0117650 filed Dec. 1, 2009, the entire contents of which application is incorporated herein for all purposes by this reference.

BACKGROUND OF THE INVENTION

1. Field of the Invention

The present invention relates to a shift lever with a button type shift knob, in more detail, a technology about an installation structure of a shift knob at the upper end of a shift lever.

2. Description of Related Art

Shift lever has a shift knob to respond to shifting of a user and the shift knob allows predetermined button type operation in addition to functioning as a handle for the driver.

Among shift knobs, there are ones that can be converted to allow the shift lever to move to a specific shift range, such as the R-range, or prevent it, by pulling up or releasing the button at the lower portion of the shift knob.

It is preferable that those shift knobs should ensure smooth and stable operation of the part, such as the button and also should be able to be easily replaced when they are damaged or broken.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shift lever with a button type shift knob that can transmit operational force of a driver by pulling up or releasing the lower portion of a shift knob and improve workability for maintenance by easily combining/separating the shift knob with/from a shift rod.

In an aspect of the present invention, the shift lever assembly with a button type shift knob may include a lower skirt slidably and rotatably coupled around a shift rod, an upper skirt disposed on the lower skirt and rotatably coupled to the lower skirt to allow relative rotation therebetween and to prevent relative straight motion therebetween, and a shift knob detachably attached to an upper portion of the shift rod, wherein the shift knob is slidably coupled to the upper skirt to permit an upper motion of the upper and lower skirts along a center axis of the shift rod and is eccentrically coupled to the upper skirt to prevent a relative rotation therebetween.

The upper skirt may include an insertion hole to receive an elastic member elastically supporting downward the upper skirt between the upper skirt and the shift knob.

The shift knob may include a sliding groove and slidably receives an upper portion of the upper skirt to permit straight motion of the upper and lower skirts along the center axis of the shaft rod, wherein the sliding groove is formed in asymmetrical shape around the center axis of the shift rod to prevent a relative rotation between the upper shirt and the shift knob.

The lower skirt may have a snap-fit protrusion protruding radially outward to restrict relative upward straight motion of the upper skirt along the lower skirt, and the upper skirt has a circular step around the inner circumstance thereof at a lower portion and the snap-fit protrusion is inserted and seated thereto.

The lower skirt may have a flange radially protruding and rotatably supporting a lower portion of the upper skirt to prevent relative downward straight motion of the lower portion of the upper skirt.

An upper end of a boot may be fixed by a boot holder on an outer circumference of the upper skirt.

The present invention provides a shift lever that can transmit operational force of a driver by pulling up or releasing the lower portion of a shift knob and improve workability for maintenance by easily combining/separating the shift knob with/from a shift rod.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
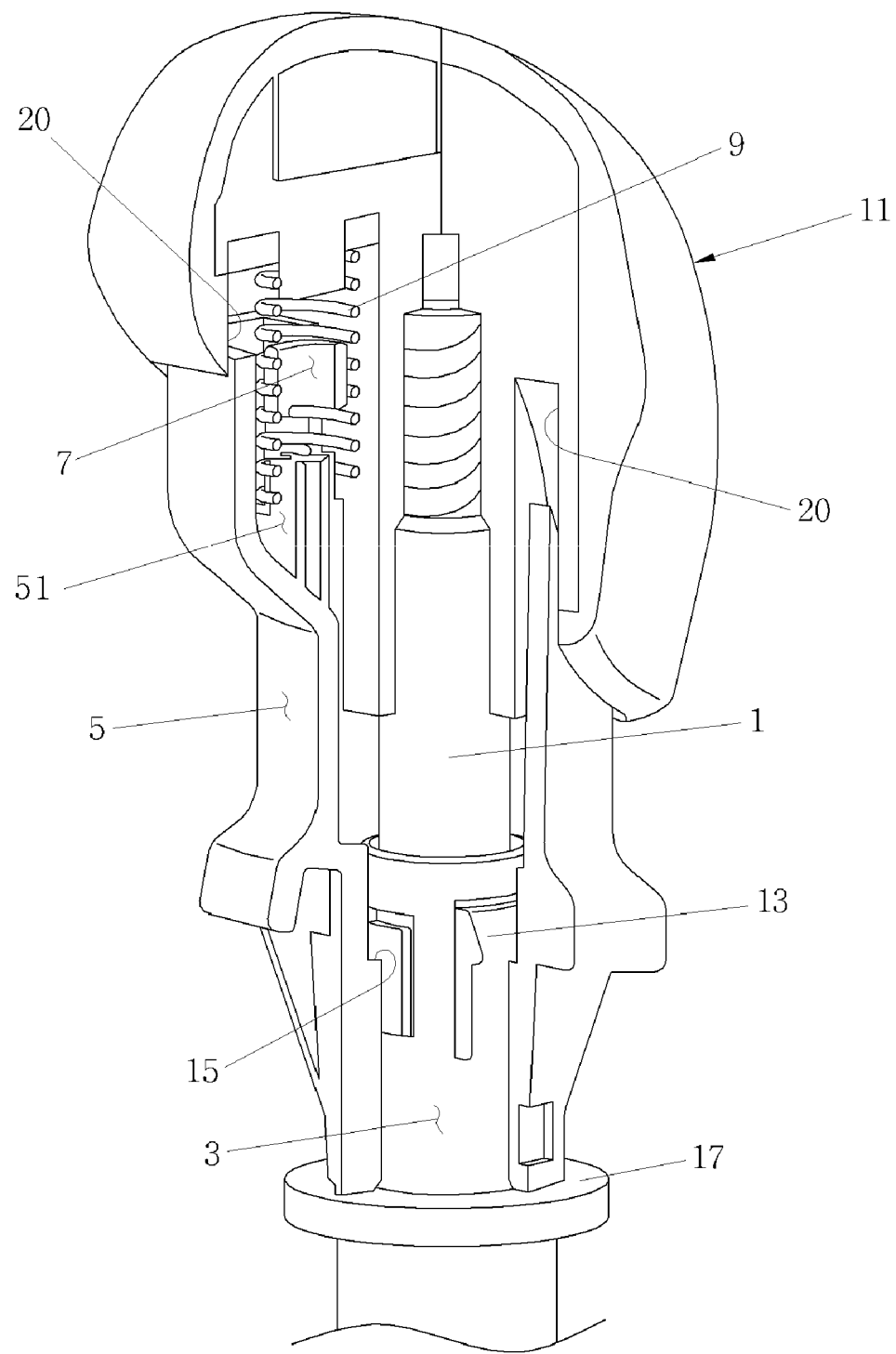
FIG. 1 is a partial cross-sectional view illustrating the structure of an exemplary shift lever with a button type shift knob according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, an exemplary embodiment of the present invention includes, a lower skirt 3 slidably fitted around a shift rod 1, an upper skirt 5 disposed above lower skirt 3 to be allowed to make relative rotation and prevented from making relative straight motion with the lower skirt 3, and a shift knob 11 having an insertion hole 7 screwed on the upper end of shift rod 1 and receiving upper skirt 5 moving upward and an elastic member 9 elastically supporting downward upper skirt 5.

That is, since shift knob 11 is screwed on shift rod 1, it can be easily removed by turning in the opposite direction. Further, when an inserting member 51 formed in the upper skirt 5 is pulled upward to shift knob 11 to be inserted in insertion hole 7, upper skirt 5 moves up while compressing elastic member 9 and lower skirt 3 moves up correspondingly with upper skirt 5.

Further, the lower end of lower skirt 3 has the lower end connected with another member or interacts with another structure having a different shape to allow or prevent a specific operation of the shift lever. For example, a mechanism allowing shift to the R-range only when upper skirt 5 and lower skirt 3 are pulled up is connected by disclosed techniques.

Lower skirt 3 has snap-fit protrusions 13 protruding radially outward to restrict relative upward straight motion of upper skirt 5, and upper skirt 5 has a circular step 15 around the inner circumstance thereof where snap-fit protrusions 13 are inserted and seated.

Further, lower skirt 3 has a flange 17 radially protruding to prevent relative downward straight motion of the lower end of upper skirt 5.

Therefore, upper skirt 5 can make relative rotation, but not relative straight motion, to lower skirt 3, such that when upper skirt 5 is pulled up, lower skirt 3 correspondingly moves, and when shift knob 11 is rotated to be seated/separated on/from shift rod 1, upper skirt 5 freely rotates with shift knob 11 irrespective of lower skirt 3. Accordingly, shift knob 11 can be easily seated and separated.

Upper skirt 5 is rotated by rotating shift knob 11, as described above, because the upper portion of upper skirt 5 which is inserted into insertion hole 7 of the shift knob 11 protrudes eccentrically from the shift rod 1.

That is, the upper portion of upper skirt 5 has a circumferentially non-uniform shape around shift rod 1 and directionality in the combination structure with shift knob 11.

The upper end of a boot 19 is fixed by a boot holder 21 on the outer circumference of upper skirt 5 in the present embodiment.

Figure 2:
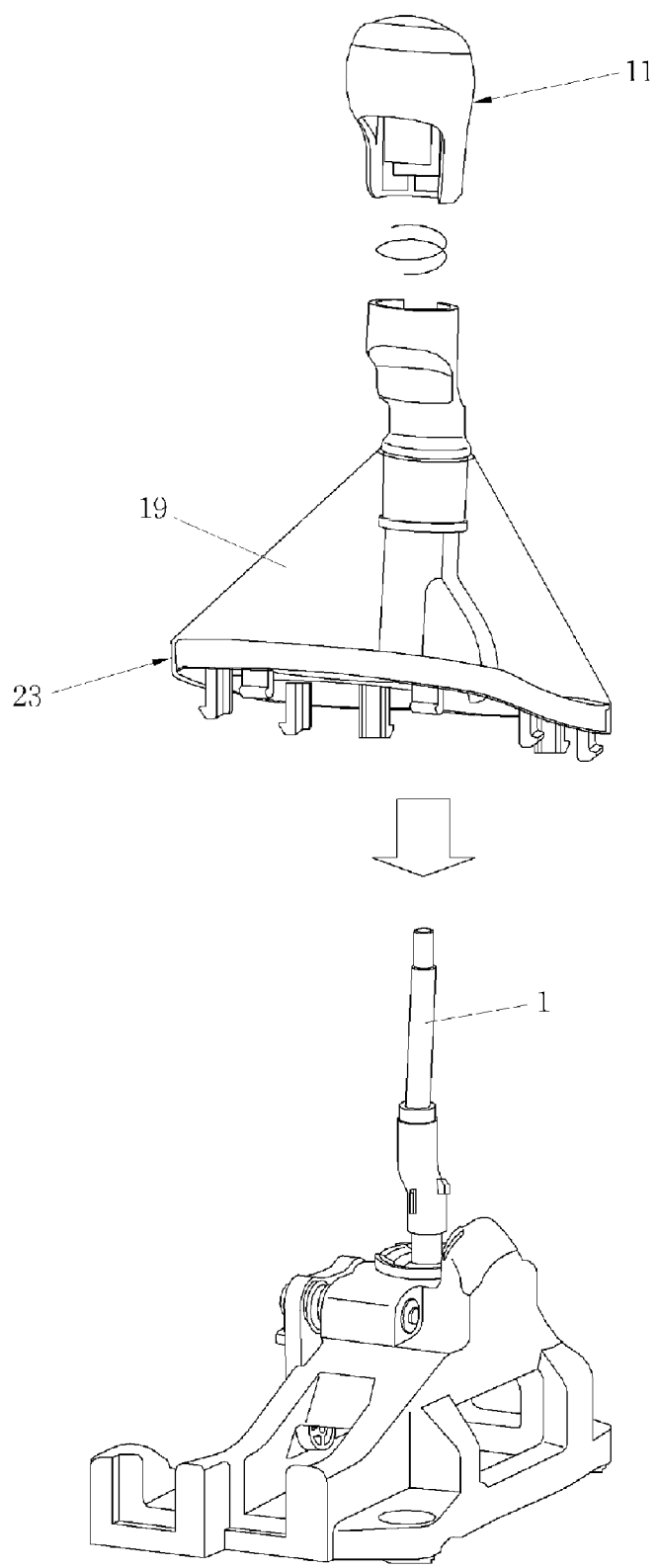
FIG. 2 is a view illustrating assemblage of the exemplary shift lever according to the present invention.
Figure 3:
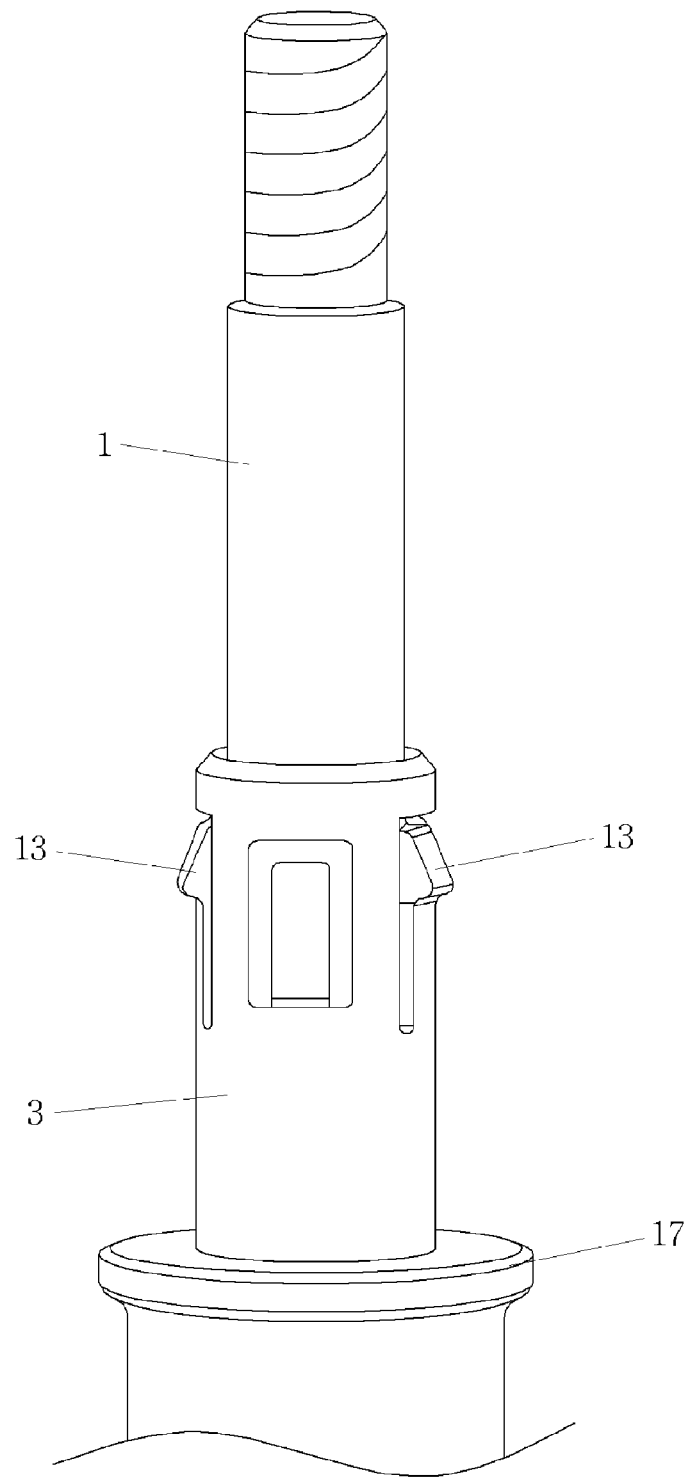
FIG. 3 is a view illustrating when a lower skirt is inserted in a shift rod in the exemplary shift lever, according to the present invention.
Figure 4:
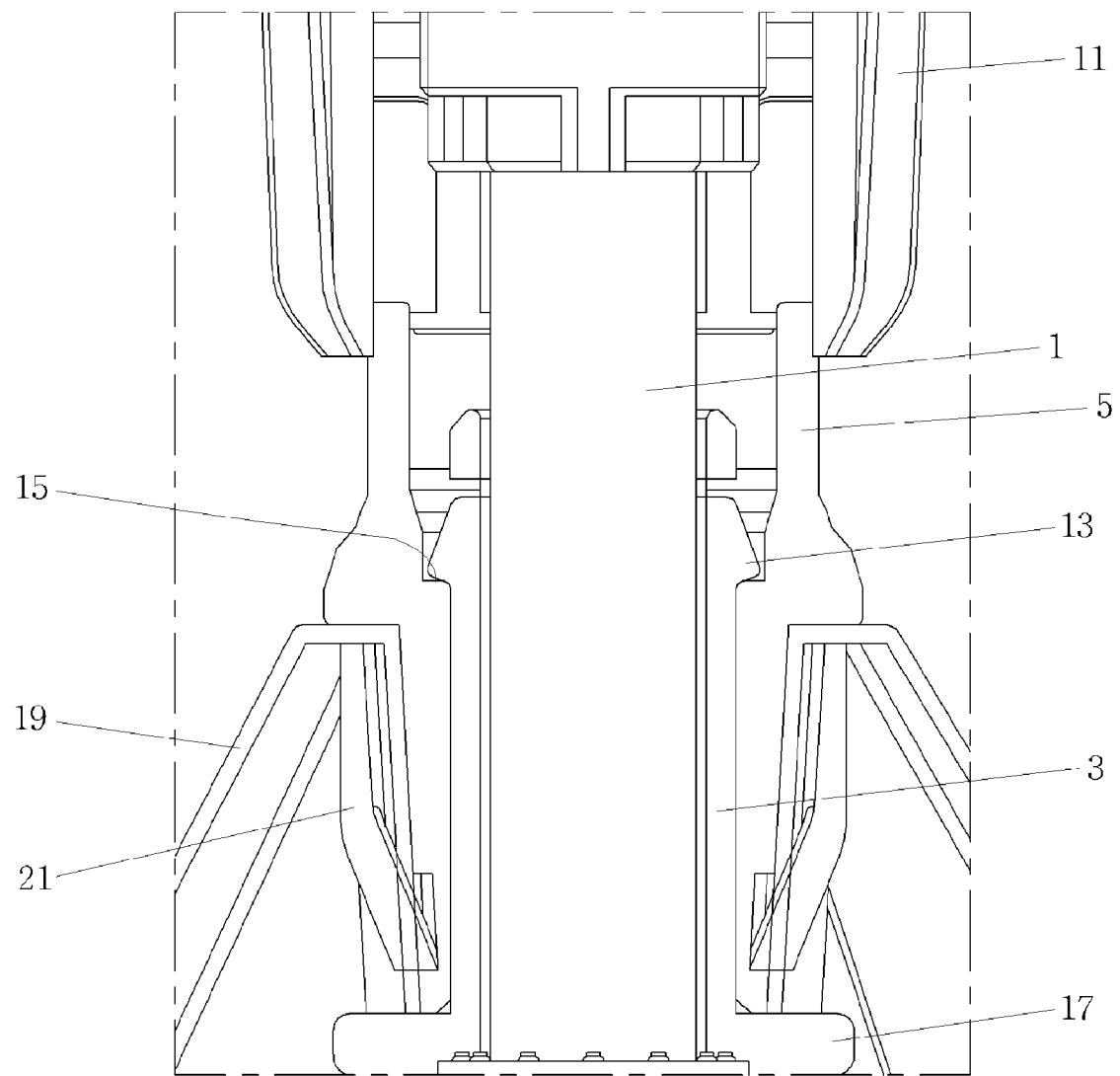
FIG. 4 is a partial cross-sectional view showing where the shift knob of the shift lever in the exemplary shift lever according to the present invention is positioned.

For reference, FIG. 2 illustrates when a skirt assembly 23 including upper skirt 5, lower skirt 3, and boot 19 is combined with shift rod 1 and then shift knob 11 is screwed.

According to the shift lever having the above configuration, it is possible to simply and easily separate shift knob 11 by unscrewing shift knob 11 from shift rod 1 in order to separate shift knob 11 for maintenance. Further, it is possible to easily assemble shift knob 11 by screwing shift knob 11.

That is, shift knob 11 is allowed to rotate such that upper skirt 5 freely rotates with shift knob 11 in order to separate shift knob 11, and upper skirt 5 is easily rotated such that the assembly direction with shift knob 11 is aligned in order to mount shift knob. Accordingly, it is temporarily assembled, and then shift knob 11 is screwed on shift rod 1. Thus, shift knob 11 is easily assembled.

In another exemplary embodiment of the present invention, the shift knob 11 may include a sliding groove 20 and slidably receives an upper portion of the upper skirt 5 to permit straight motion of the upper and lower skirts 5 and 3 along the center axis of the shaft rod 1.

The sliding groove 20 may be formed in asymmetrical shape around the center axis of the shift rod 1 to prevent a relative rotation between the upper shirt 5 and the shift knob 11.

For convenience in explanation and accurate definition in the appended claims, the terms "upper", "lower," "inner," and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift lever assembly with a shift knob comprising:
   a lower skirt slidably fitted around a shift rod;
   an upper skirt disposed above the lower skirt and rotatably coupled to the lower skirt to be allowed to make relative rotation therebetween and prevented from making relative upward straight motion therebetween; and
   a shift knob screwed on an upper end of the shift rod and having an insertion hole to slidably receive the upper skirt moving upward and an elastic member elastically biasing downward the upper skirt;
   wherein the lower skirt has snap-fit protrusions protruding radially outward to restrict relative the upward straight motion of the upper skirt, and the upper skirt has a circular step around an inner circumference thereof where the snap-fit protrusions are inserted and seated; and
   wherein the upper skirt includes an inserting member protruding toward the insertion hole and being selectively inserted in the insertion hole, the inserting member being offset from a center axis of the shift rod.

2. The shift lever assembly as defined in claim 1, wherein the lower skirt has a flange radially protruding and slidably supporting the upper skirt to prevent relative downward straight motion of a lower end of the upper skirt.

3. The shift lever assembly as defined in claim 2, wherein an upper portion of the upper skirt which is inserted in the insertion hole of the shift knob is offset radially from a center axis of the shift rod.

4. The shift lever assembly as defined in claim 3, wherein an upper end of a boot is fixed by a boot holder on an outer circumference of the upper skirt.

* * * * *